United States Patent
Marechal et al.

(10) Patent No.: US 9,606,509 B2
(45) Date of Patent: Mar. 28, 2017

(54) MAGNETIC DEVICE FOR PIVOTING AN ARBOR OF A ROTATING MEMBER IN A TIMEPIECE MOVEMENT

(71) Applicant: Montres Breguet S.A., L'Abbaye (CH)

(72) Inventors: Sylvain Marechal, Bois-d'Amont (FR); Benoit Legeret, Le Sentier (CH)

(73) Assignee: Montres Breguet S.A., L'Abbaye (CH)

( * ) Notice: Subject to any disclaimer, the term of this patent is extended or adjusted under 35 U.S.C. 154(b) by 0 days.

(21) Appl. No.: 15/149,639

(22) Filed: May 9, 2016

(65) Prior Publication Data
US 2016/0370765 A1 Dec. 22, 2016

(30) Foreign Application Priority Data

Jun. 16, 2015 (EP) ..................................... 15172405

(51) Int. Cl.
*G04B 31/00* (2006.01)
*G04B 31/012* (2006.01)
*F16C 32/04* (2006.01)

(52) U.S. Cl.
CPC .......... *G04B 31/012* (2013.01); *F16C 32/041* (2013.01); *F16C 32/0408* (2013.01); *G04B 31/00* (2013.01)

(58) Field of Classification Search
CPC .. G04B 31/00; G04B 31/004; G04B 31/0085; G04B 31/012; F16C 32/0406; F16C 32/0408; F16C 32/041; F16C 32/0417
See application file for complete search history.

(56) References Cited

U.S. PATENT DOCUMENTS

| 3,582,162 A | * | 6/1971 | Baermann | G04B 31/00 310/90.5 |
| 3,635,013 A | * | 1/1972 | Bertsch | G04C 3/04 368/169 |

(Continued)

FOREIGN PATENT DOCUMENTS

| FR | 1098890 | 8/1955 |
| WO | WO 2012/062524 A1 | 5/2012 |

OTHER PUBLICATIONS

European Search Report issued Dec. 16, 2015 in European Application 15172405.1 filed on Jun. 16, 2015 (with English translation).

*Primary Examiner* — Vit W Miska
(74) *Attorney, Agent, or Firm* — Oblon, McClelland, Maier & Neustadt, L.L.P.

(57) ABSTRACT

The device for pivoting an arbor of a rotating member, on a determined pivot axis, inside a timepiece movement includes at least one magnetic bearing including a magnet which exerts a force of attraction on a pivot made of magnetic material, of the arbor, and an endstone arranged between the magnet and the pivot, the endstone being formed of a material having a hardness greater than 500 HV and a friction coefficient less than or substantially equal to 0.1 with the material of which the pivot is made. The material forming the endstone has a high magnetic permeability and the endstone has, in cross-section to the pivot axis, smaller dimensions than those of the magnet, said endstone being arranged in the timepiece movement to be centred on the determined pivot axis.

11 Claims, 5 Drawing Sheets

(56) References Cited

U.S. PATENT DOCUMENTS

| | | | | |
|---|---|---|---|---|
| 4,308,605 A | * | 12/1981 | Ayer | ............ G04B 13/02 368/127 |
| 4,340,038 A | | 7/1982 | McKean | |
| 8,777,481 B2 | * | 7/2014 | Conus | ............ G04B 31/04 368/324 |
| 2012/0112589 A1 | | 5/2012 | Marechal et al. | |
| 2012/0113767 A1 | * | 5/2012 | Marechal | ............ G04B 31/02 368/287 |
| 2015/0234361 A1 | | 8/2015 | Marechal et al. | |

\* cited by examiner

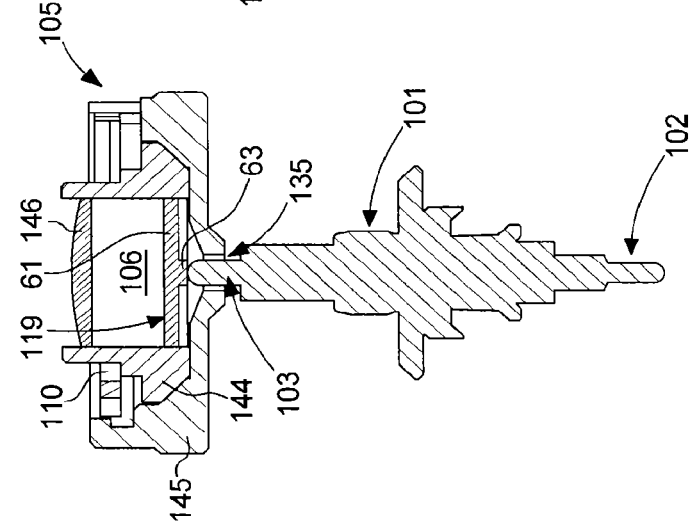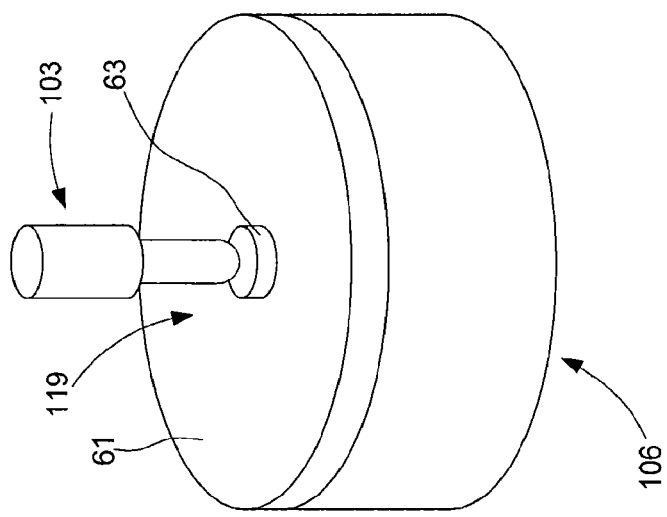

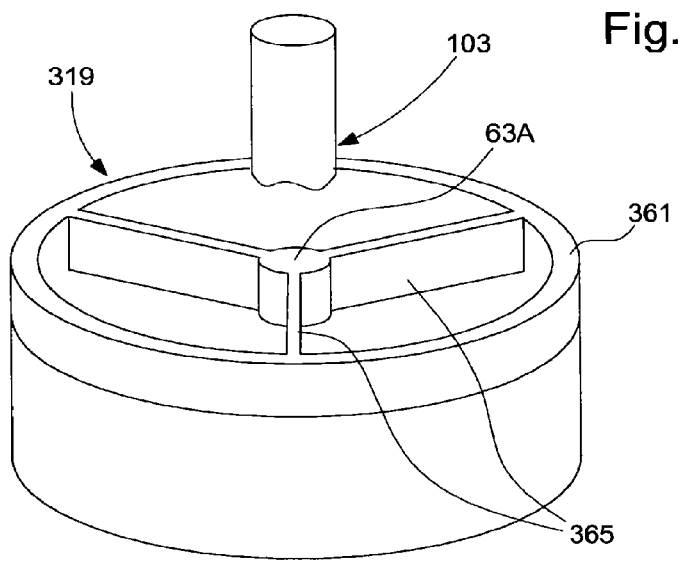
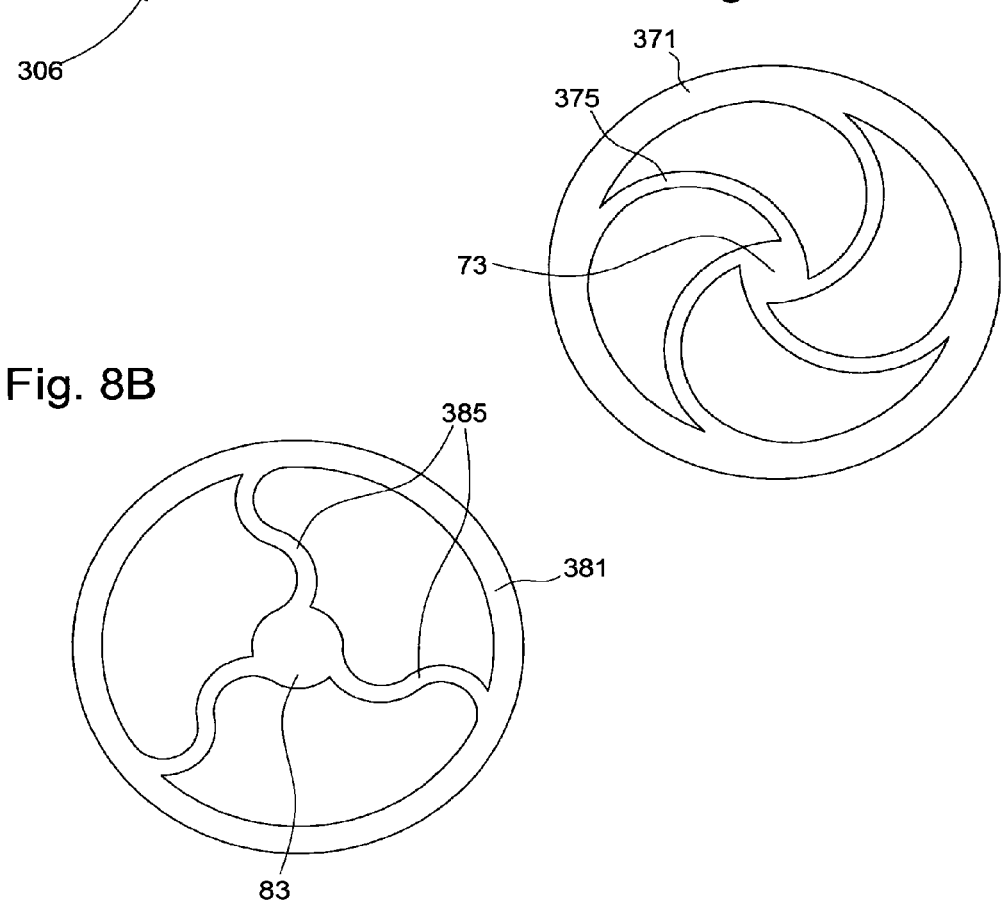

MAGNETIC DEVICE FOR PIVOTING AN ARBOR OF A ROTATING MEMBER IN A TIMEPIECE MOVEMENT

This application claims priority from European Patent Application No. 15172405.1 filed on Jun. 16, 2015, the entire disclosure of which is hereby incorporated herein by reference.

FIELD OF THE INVENTION

The present invention concerns a timepiece assembly comprising an arbor of a rotating member and a device for pivoting the arbor about a determined axis inside a timepiece movement, including at least one magnetic bearing comprising a magnet which exerts a force of attraction on a pivot, made of magnetic material, of the arbor, and an endstone arranged between the magnet and the pivot. The present invention more specifically concerns such a device wherein the friction coefficient between the endstone and the pivot is less than or substantially equal to 0.1 and wherein the material of which the endstone is formed has a hardness greater than 500 HV.

PRIOR ART

The use of permanent magnets in rotating members of timepiece movements is potentially advantageous, especially because it enables significant localised forces to be created while limiting friction.

There are known magnetic pivoting devices which meet the definition given in the preamble. The device for pivoting an arbor in a timepiece which is shown in FIG. 13 of patent document WO 2012/062524 is one example. FIG. 1 annexed hereto is a reproduction of this prior art illustration. The pivoting device shown is provided for an arbor 1 whose ends form two pivots, respectively referenced 2 and 3. The pivots are made of a magnetic material. The Figure also shows a first bearing and a second bearing arranged to support and guide in rotation the two pivots 2 and 3. Each of the two bearings includes a setting, respectively referenced 40 and 44, a permanent magnet, respectively referenced 4 and 6, mounted in the setting, and a jewel cap, respectively referenced 18 and 19, inserted between the magnet and the opening of the setting. Magnets 4 and 6 of the first bearing and second bearings are oriented so as to attract respectively the first and second pivots, so that arbor 1 is maintained in the pivot axis, with some radial and axial play.

Producing reliable timepiece mechanisms that operate in accordance with the principles described above represents a significant technical challenge, because of the extremely reduced dimensions and high spatial precision required to perform chronometric functions with precision.

Indeed, most natural or synthetic magnetic materials are inhomogeneous on the scale of a millimetre of less. The positioning and intensity of magnetic fields on this scale is thus difficult to control. In particular, permanent micromagnets which have the highest magnetic energy intensity, for example SmCo or NdFeB micro-magnets, are typically manufactured from powders of chemical elements from the rare earth family, as their granular structure has dimensions comprised between 1 and 100 microns. The homogeneity of the magnetic field generally decreases as it approaches the grain scale.

Another drawback of the type of pivoting devices shown in FIG. 1 is related to the presence of the jewel cap (respectively 18 and 19) between the magnet and the pivot. Indeed, the presence of the jewel cap has the effect of increasing the width of the air-gap between the magnet and the pivot. It is known that the magnetic field intensity decreases rapidly as one moves away from the surface of the magnet. In these conditions, the thickness of the jewel cap is sufficient to considerably reduce the intensity of the return force exerted by the magnet on the pivot.

BRIEF SUMMARY OF THE INVENTION

It is an object of the present invention to overcome the aforementioned drawbacks of the prior art by providing a pivoting device wherein the magnetic field distribution at the bearing surface is determined with greater precision, so that the magnetic flux is largely concentrated in a small area centred on the pivot axis.

The present invention achieves this object by providing a timepiece assembly comprising the arbor of a rotating member and a device for pivoting the arbor about a determined pivot axis inside a timepiece movement, the pivoting device including at least one magnetic bearing comprising a magnet, which exerts a force of attraction on a pivot, made of magnetic material, of the arbor, and an endstone arranged between the magnet and the pivot. The endstone is formed of a material having a hardness greater than 500 HV and a friction coefficient less than or substantially equal to 0.1 with the material of which the pivot is made. The material forming the endstone also has a high magnetic permeability and exhibits, in cross-section to the pivot axis, smaller dimensions than those of the magnet, the endstone being arranged in the timepiece movement to be centred on the determined pivot axis.

It is specified that "material with a high magnetic permeability" means a material whose relative magnetic permeability reaches a maximum that is greater than 10, and wherein the magnetic field saturation value is greater than 0.5 Tesla.

According to the invention, the endstone is made of a material with a high magnetic permeability and is arranged between the magnet and the pivot. In these conditions, it will be understood that, from a magnetic point of view, the endstone of the invention plays the part of a pole piece. Further, because in cross-section the dimensions of the pole piece are smaller than those of the magnet, the pole piece acts as a magnetic flux concentrator. As a result of this feature, the invention makes it possible to increase, on the one hand, the magnetic field intensity at the bearing surface of the endstone, and on the other hand, the radial gradient of the magnetic field. A first advantage of the invention is thus to increase the magnetic return force which acts radially on the pivot.

According to the invention, the endstone is arranged to be centred on the pivot axis. Further, as the endstone concentrates the magnetic field, the area where the magnetic field is most intense is also centred on pivot axis. This is the case regardless of the assembly tolerances of the magnet. One advantage of this feature is that, instead of driving in the magnet, it is possible to use a less precise but also less restrictive method, such as adhesive bonding for example. The risk of damaging the magnetic field produced by the magnet is thus reduced. It will also be understood that a second advantage of the aforementioned feature is that the pivot is centred with improved precision regardless of any magnetic defects in the magnet.

According to the invention, the same component plays the part of an endstone and that of a magnetic flux concentrator, and also that of the magnetic structure for centring the magnetic arbor, i.e. for aligning the arbor on the pivot axis provided. A third advantage of the invention is therefore that it concentrates the magnetic flux while correctly centring the pivot on the pivot axis provided, without increasing the dimensions of the pivoting device. Further, it will be understood that in reducing the number of components, the invention makes it possible to simplify the design and reduce costs.

BRIEF DESCRIPTION OF THE DRAWINGS

Other features and advantages of the invention will appear upon reading the following description, given solely by way of non-limiting example, with reference to the annexed drawings, in which:

FIG. 2 is a schematic diagram of a pivoting device according to a first embodiment of the invention.

FIGS. 3 and 4 are partial, respectively longitudinal cross-sectional and perspective views of an anti-shock pivoting device corresponding to a variant of a first embodiment of the invention.

FIG. 7 is a schematic perspective view of a pivoting device corresponding to a third embodiment of the invention.

FIGS. 8A and 8B are schematic plan views of two endstones corresponding to variants of the FIG. 7 embodiment.

DETAILED DESCRIPTION OF EMBODIMENTS

Figure 1:
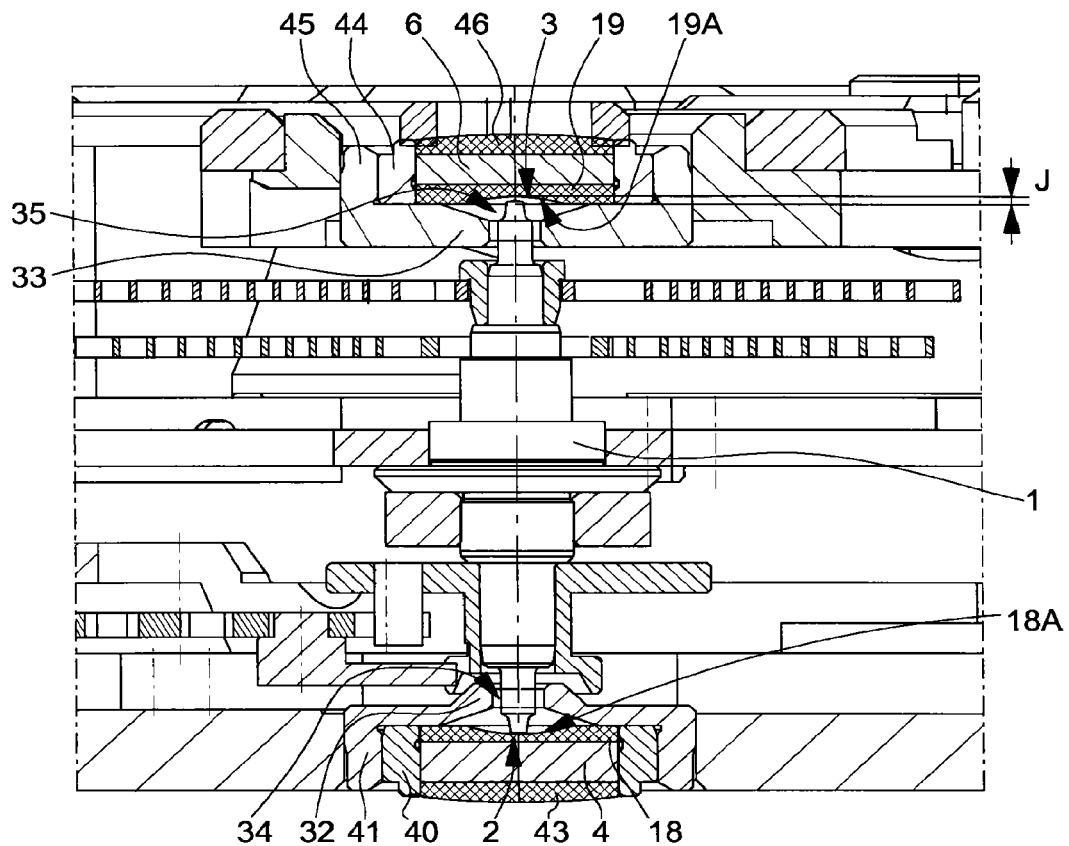
FIG. 1 is a longitudinal cross-sectional view of a magnetic pivoting device of the prior art.

FIG. 2 is a schematic diagram of a pivoting device according to a first embodiment of the invention. According to the invention, the endstone (referenced 63) is a multi-functional endstone since it also plays the part of a pole piece. Referring to FIG. 2, there is seen a permanent magnet 106, a pole structure 119 and a pivot 103. Pole structure 119 is formed of a central portion formed by endstone 63 and a peripheral portion, notably a frame 61. In the present example, frame 61 has the general shape of a plate at the centre of which is arranged the endstone. According to the invention, endstone 63 is formed of a material with a high magnetic permeability, and frame 61 which surrounds it may advantageously be formed of the same material as the actual endstone. In such case, the plate which, in the first embodiment, forms the frame, preferably has a thickness which is considerably thinner than that of the actual endstone. Indeed, the fact that the plate is of small thickness prevents it becoming a shield returning the field lines back towards the other pole of the magnet. Preferably, frame 61 has the form of a thin plate which surrounds the endstone and whose thickness is less than one tenth of the thickness of the endstone.

Alternatively, it is also possible to make the frame in a different material from that forming the endstone. It is possible, for example, to choose a material that has a low magnetic permeability, in particular a non-magnetic material; i.e. a material having a magnetic permeability close to the value 1. In the second case, the plate, which in the present embodiment forms frame 61, may advantageously have approximately the same thickness as endstone 63, the latter being inserted in a hole, preferably a through hole, located at the centre of the frame.

Within the context of the development leading to the invention, the inventors sought magnetic materials that also have good tribological properties for endstone 63. They therefore selected alloys that combine a hard metal with a cobalt or nickel binder. According to an advantageous variant, the hard metal in question is tungsten carbide (WC). According to a preferred variant, the material forming the endstone is a mixture of tungsten carbide and cobalt including between 20 and 25% of cobalt. Alternatively, the material forming the endstone may be a magnetic metallic glass. Advantageously, the metallic glass is a member of the iron-based metallic glass family (iron-cobalt-nickel). Preferably, a metallic glass of composition (Fe,Co,Ni)-(Al,Ga)-(P,C,B,Si,Ge) or of composition (Fe,Co,Ni)-(Zr,Nb,Hf,Ta,Mo,W)-(P,C,B,Si) will be used. Another advantageous alternative is to choose a praseodymium-neodymium based metallic glass.

If the material of which the endstone is made is such a praseodymium-neodymium based metallic glass, it is preferably a metallic glass of composition (Nd,Pr)-(Fe,Ni,Cu)-Al.

Referring again to FIG. 2, it can be seen that in the illustrated example, pole structure 119 is placed directly on magnet 106. The magnet and the pole structure are both in cylindrical form with an identical diameter. It will be understood, however, that the diameter of the pole structure is not necessarily equal to that of the magnet. For example, the diameter of the magnet could advantageously be comprised between 0.4 and 1.5 mm, and its thickness could be comprised between 0.2 and 2.0 mm. According to the invention, the dimensions of endstone 63, in cross-section to the pivot axis, are smaller than those of the magnet. Also by way of example, the diameter of the endstone could advantageously be comprised between 0.1 and 0.2 mm, and its thickness between 80 and 150 µm. Finally, the external diameter of frame 61 could be comprised, for example, between 0.1 and 1.2 mm. If the frame is made in the same material as the endstone, its thickness is preferably comprised between 40 and 100 µm.

Referring again to FIG. 2, it can be seen that pivot 103 is in direct contact with endstone 63 at the centre of the pole structure. Because of its magnetic properties, the endstone acts as a pole disk concentrating a considerable share of the total magnetic flux. Thus, pivot 103 is subject to a magnetic force that attracts it towards the centre of pole structure 119. Further, as seen above and according to the invention, endstone 63 is centred on the pivot axis provided. In these conditions, it will be understood that arbor 101 (FIGS. 3, 4 and 5) is maintained in the pivot axis, with some radial play, by a magnetic centring structure formed by the endstone.

Figure 5:
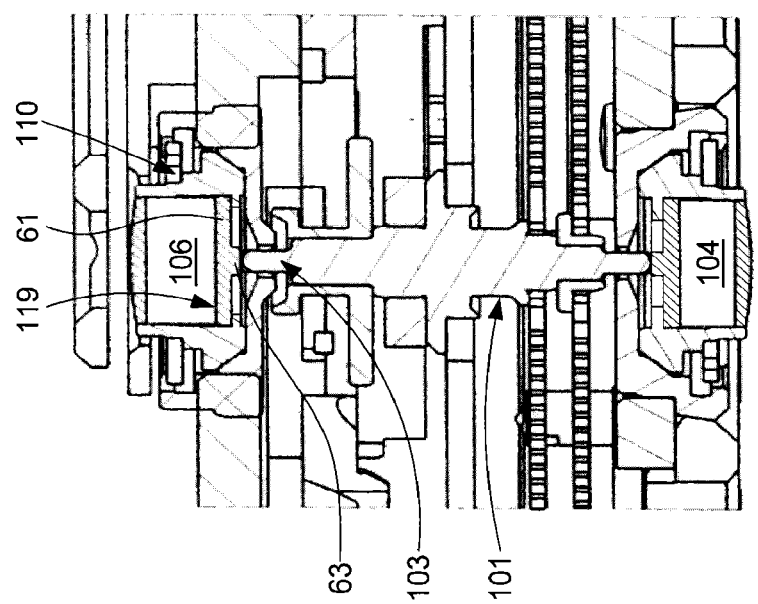
FIG. 5 is a partial cross-sectional view of a watch movement, which illustrates an example of how the pivoting device of FIGS. 3 and 4 can be incorporated in a timepiece movement.

Referring now more specifically to FIGS. 3, 4 and 5, a design variant will now be described in more detail for the first embodiment of the invention. This embodiment corresponds to an anti-shock pivoting device.

The illustrated pivoting device includes an arbor 101 whose ends form two pivots, respectively referenced 102 and 103. Pivot 103 is made of a magnetic material. The Figures also show a first bearing 105 including a magnet 105, arranged to support and guide in rotation pivot 103, and a second bearing including a magnet 104 similar to the first bearing.

Hereinafter there will be described only the first bearing, which includes a setting 144, a bearing jewel 146 abutting against the bottom of the setting, a permanent magnet 106 mounted in the setting against the bearing jewel, and a pole structure 119 inserted between the magnet and the opening of the setting. In the illustrated example, bearing jewel 146 has no technical function other than closing the bottom of the setting and acting as a bearing surface for the magnet. The bearing jewel also fulfils a decorative function by concealing the magnet. The Figures also show a support 145, whose base includes an opening 135 for the passage of the pivot 103. Support 145 is arranged to position and to resiliently maintain setting 144. To this end, the setting is retained in an inverted cone-shaped housing in support 145 by resilient means, which, in the present example, are formed by a spring 110. In the illustrated example, support 145 is a part of revolution comprising a circular rim.

According to the invention, endstone 63 is arranged in the timepiece movement to be centred on the pivot axis. It will be understood that, according to the embodiment of the present example, the endstone is positioned by means of frame 61 which is in turn rigidly maintained in setting 144, the setting thus serving as a support for the endstone. One possibility for rigidly assembling the pole structure and the setting is forcibly inserting the frame into the setting.

If the timepiece movement is subjected to an axial shock, pivot 103 of balance staff 101 pushes pole structure 119 and setting 144 upwards. In such case, it is only spring 110 that acts to return the setting and the balance staff to their initial position. Spring 110 is dimensioned to have a limited displacement so that beyond its limit, a shoulder of staff 101 abuts against the outer edge of opening 135 so as to allow a thicker portion of the staff to absorb the shock. In the event of a lateral shock of moderate intensity, it is only the magnetic field produced by magnet 106 and concentrated by endstone 63 that acts to return the pivot to its position of equilibrium. It will be understood that the position of equilibrium of the pivot corresponds to the maximum magnetic field intensity and that the location of this maximum intensity coincides with the centre of endstone 63. If the intensity of the lateral shock exceeds a certain limit, the force produced by the magnetic field is not sufficient to retain pivot 103. The pivot then abuts against the outer edge of opening 135. Next, once the travel of the pivot has been stopped by the outer edge of the opening, the magnetic force can return the pivot towards its position of equilibrium.

Figure 6A:
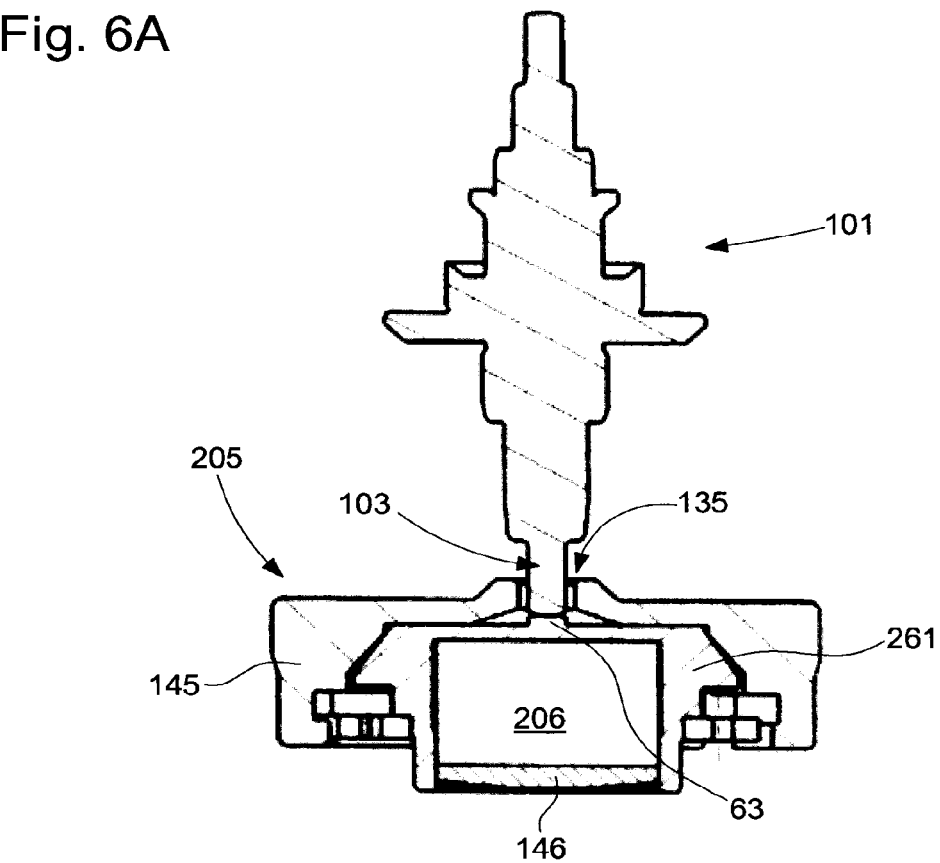
FIG. 6A is a partial longitudinal cross-sectional view, similar to that of FIG. 3, but illustrating a pivoting device corresponding to a first variant of a second embodiment of the invention.
Figure 6B:
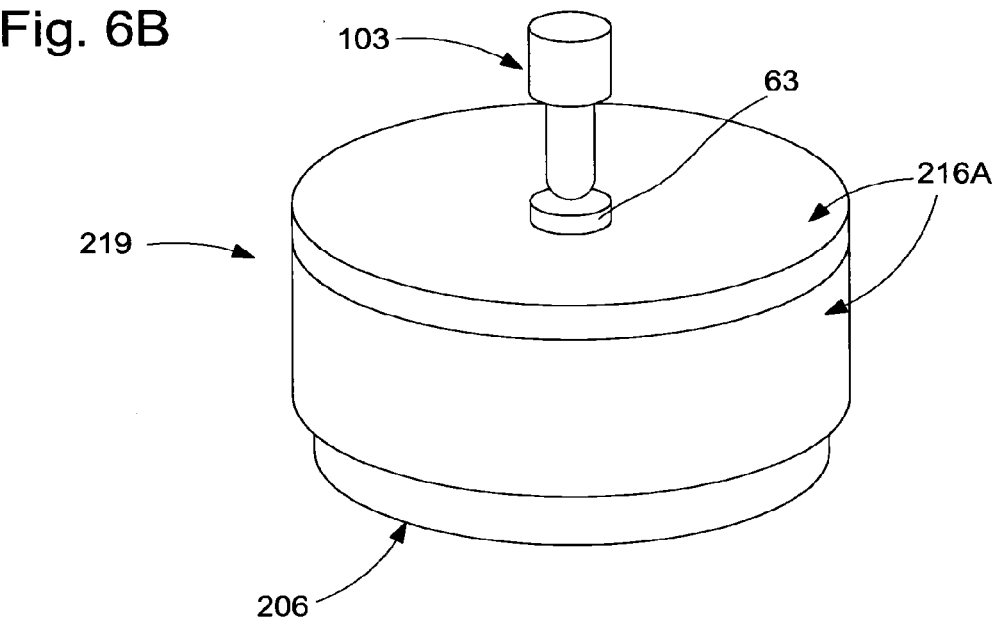
FIG. 6B is a perspective view of a pivoting device according to a second variant of the second embodiment of the invention.

FIGS. 6A and 6B correspond to a second specific embodiment of the invention. FIG. 6A is a partial longitudinal cross-section of this second embodiment of the pivoting device of the invention. FIG. 6B is a schematic perspective view corresponding to the second embodiment. Referring first of all to FIG. 6B, it can be seen that the illustrated pole structure 219 has the general form of a hollow socket (which opens downwards in the drawing).

As shown in the Figure, a permanent magnet 206 is inserted from below into the cavity formed inside pole structure 219. Above magnet 206, the flat bottom of the socket is similar to the pole structure 119 shown in FIG. 2. Endstone 63 is arranged at the centre of the flat bottom, in the axis of the socket. The rest of the socket forms frame 216A, which, as in the preceding example, can either be made of the same material as the endstone, or in a different material. In the illustrated example, the pole structure has cylindrical symmetry. It will be understood however that the socket could alternatively have a square, elliptical, polygonal section, etc.

FIG. 6A is very similar to FIG. 3. This is why any elements of FIG. 6A that are virtually identical to elements of FIG. 3 have been attributed the same reference numbers and will not be described again here. It will be noted, however, that magnet 206 has a smaller diameter than the diameter of magnet 106 of FIG. 3, which makes it possible for magnet 206 to be driven into or adhesive bonded inside the socket-frame of pole structure 219. As a result of the cavity contained therein, pole structure 219 of the pivoting device according to the embodiment of the present example simultaneously fulfils the function of a pole structure that includes endstone 63 according to the invention, and of a setting arranged to receive magnet 206. One advantage of this embodiment is therefore that it simplifies the construction of an anti-shock bearing.

FIGS. 7, 8A and 8B illustrate a third exemplary embodiment of the invention. As can be seen in the Figures, according to this embodiment, the pole structure includes an annular space which separates the frame from the endstone which, according to the invention, is formed of a magnetic material having good tribological properties. At least three bars connect the frame to the endstone through this annular space. Referring first of all to FIG. 7, there is seen a permanent magnet 306, a pole structure 319 and a pivot 103 (the end portion of the pivot has been removed to make pole structure 319 more visible). It can be seen that pole structure 319 is formed of a central portion defining endstone 63A, which is formed by a small cylinder defining a central disc, and of a peripheral portion or frame 361. In the present embodiment, frame 361 has the general shape of a ring which is connected to the endstone by at least three arms referenced 365.

It will be understood that frame 361 and arms 365 can be formed of the same material as the actual endstone. In such case, the presence of an annular space between the endstone and the frame prevents the pole structure forming a shield returning the field lines back towards the other pole of the magnet. Thus, the third embodiment makes it possible to have a thicker, and thus more solid frame, even if it is made of the same material as the endstone. Alternatively, frame 361 and arms 365 may be made of a different material from that forming the endstone.

Referring more specifically now to FIG. 8A, it can be seen that the pole structure shown includes a frame 371 and an endstone 73 connected to each other by four connecting elements 375. As can be seen, the connecting elements illustrated are in the form of small bars bent in an arc of a circle. It will be understood that, in the variant shown, the curvature of small bars 375 forms a resilient connection between the central portion and the peripheral portion. Indeed, frame 371 is arranged around endstone 73 in order to carry it. In such conditions, the resilience of the arms allows the endstone to be resiliently maintained in place at the centre of the frame. Thus, even if the frame is deformed when it is inserted into a setting for example, the endstone substantially maintains its central position relative to the frame of the pole structure and to the setting. It will be understood that the resilient arms thus ensure a degree of "self-centring" of the endstone.

Referring now to FIG. 8B, it can be seen that the centring structure illustrated includes a frame 381 and an endstone 83 connected to each other by three connecting elements 385. As can be seen, the connecting elements illustrated are in the form of small bars bent in an S shape. It will be understood that, as in the preceding variant, in the variant shown, the curvature of the small bars 385 has the effect of increasing the resilience of the connection between the central portion and the peripheral portion.

Figure 9:
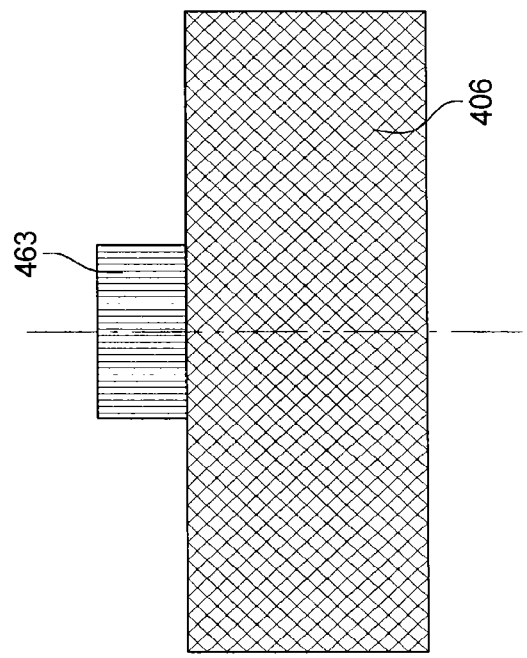
FIG. 9 is a partial longitudinal cross-sectional view illustrating a bearing of a pivoting device corresponding to a fourth embodiment of the invention.

FIG. 9 is a partial longitudinal cross-sectional view illustrating a bearing of a pivoting device corresponding to a fourth embodiment of the invention. One peculiarity of this latter embodiment is that the pole structure does not have a peripheral frame but is limited to an endstone whose dimensions, in cross-section to the pivot axis, are smaller than those of the magnet. In the Figure there is seen a magnet 406 and an endstone 463 which is bonded directly onto the magnet. The endstone is formed, according to the invention, of a magnetic material having good tribological properties.

What is claimed is:

1. A timepiece assembly including the arbor of a rotating member and a device for pivoting said arbor about a determined pivot axis inside a timepiece movement, the pivoting device including at least one magnetic bearing including a magnet, which exerts a force of attraction on a pivot made of magnetic material, of the arbor, and an endstone arranged between the magnet and the pivot, the endstone being formed of a material having a hardness greater than 500 HV and a friction coefficient less than or equal to 0.1 with the material of which the pivot is made; wherein the material forming the endstone has a high magnetic permeability, wherein said endstone has, in cross-section to the pivot axis, smaller dimensions than those of the magnet, and wherein the endstone is arranged in the timepiece movement to be centred on the determined pivot axis.

2. The timepiece assembly according to claim 1, wherein the magnetic bearing includes a pole structure which includes the endstone and a frame arranged around the endstone, the endstone being maintained centred on the determined pivot axis by means of the frame fixed to a support of the timepiece movement.

3. The timepiece assembly according to claim 2, wherein the frame and the endstone are in one piece.

4. The timepiece assembly according to claim 3, wherein the frame has the form of a thin plate which surrounds the endstone and those thickness is less than one tenth of the thickness of the endstone, said plate being arranged against a surface of the magnet.

5. The timepiece assembly according to claim 2, wherein the pole structure has the form of a socket with said endstone arranged at an end face of said socket, the magnet being mounted inside said socket so that the endstone is abutting against a surface of the magnet.

6. The timepiece assembly according to claim 2, wherein the pole structure includes an annular space, which separates the frame from the endstone, and at least three arms which connect the frame to the endstone through the annular space.

7. The timepiece assembly according to claim 6, wherein the arms that connect the frame to the endstone are resilient.

8. The timepiece assembly according to claim 2, wherein the frame is formed of a substantially non-magnetic material.

9. The timepiece assembly according to claim 1, wherein the endstone material which has a high magnetic permeability is formed of a mixture of hard metal and cobalt or nickel.

10. The timepiece assembly according to claim 9, wherein said selected hard metal is tungsten carbide (WC) and said binder is cobalt, the percentage of cobalt in said mixture being substantially between 20% and 25%.

11. The timepiece assembly according to claim 1, wherein the material with a high magnetic permeability forming the endstone is a magnetic metallic glass.

* * * * *